United States Patent Office 3,554,720
Patented Jan. 12, 1971

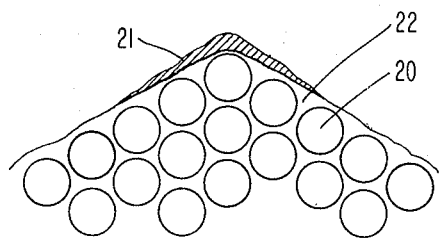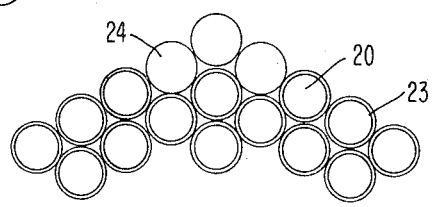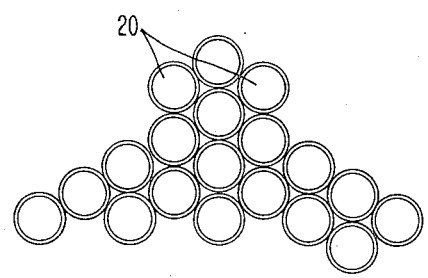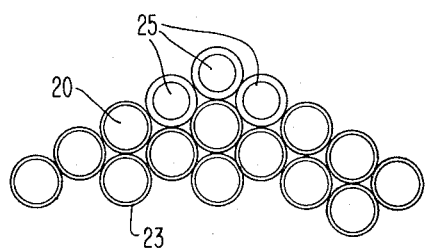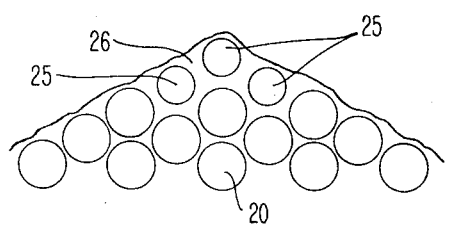

3,554,720
MANUFACTURE OF OPTICAL PLATES
Reneé Michelle Crépet, Villepinte, France, assignor to Compagnie de Saint-Gobain, Neuilly-sur-Seine, France
Filed Oct. 30, 1967, Ser. No. 678,984
Claims priority, application France, Nov. 4, 1966, 82,585
Int. Cl. C03c 23/20; C03b 11/08
U.S. Cl. 65—4                                                   10 Claims

ABSTRACT OF THE DISCLOSURE

Optical plates, useful inter alia as parts of cathode tubes, are mosaics of interfitting, prismatic disks without apertures at the apexes of the prism angles, optionally with means to absorb dispersed light. They are made by a novel process.

---

This invention relates to the manufacture of novel glass optical plates which, inter alia, find use in cathode ray tubes. Such plates have heretofore been plagued with the objection that small holes or apertures extend through them. This defect is especially noticeable when the optical plates attain 25 mm. in diameter or more, few of such plates being free of defects. While such defects are reduced in number in smaller plates they occur with annoying frequency, establishing the need for general amelioration of product and process. It is an object of this invention to prepare such plates free from porosities. Another problem has been to reduce the effect of the dispersion of light from the light-transmitting glass fibers. The invention will be described in its preferred and in alternative forms as to process, and in its novel structure, but before that description it is advisable to establish a glossary of terms and to consider the prior art.

Optical fibers are glass fibers of high index of refraction and high softening point coated with a sleeve of glass of lower index of refraction and lower softening point.

Staple fibers are short lengths of any kind of fiber. Optical fiber staple fiber is used in this invention.

Bundles of optical fibers are staple fiber optical fibers aligned in parallel in contiguous relation. These bundles are used for drawing drawn multiple optical fibers.

Drawn multiple optical fibers are the product of drawing softened bundles.

Disks are geometric disks cut from the ends of drawn optical fibers, usually to the thickness desired in the cathode plate.

Optical plates are plates composed of interfitting, self-welded disks.

Mosaic, the pattern of the disks in the plate.

Prism, a closed geometric body, angular in outline such as triangular, hexagonal.

In the prior art, optical disks were made from optical fibers, and optical plates were made from optical disks. The prior art to which I refer is not necessarily anticipatory of this invention. According to that prior art, optical fibers having a glass core of high index of refraction and softening point and a glass sleeve of lower index of refraction and softening point were manufactured to a relatively large diameter, although the diameter could be as desired. The terms high and low are used in relation to each other and not as matched against some arbitrary scale.

These optical fibers were cut into staple fibers of the same length. The staple fibers were placed in parallel in a prismatic mold of which the length was equal to that of the staple fibers. The section of the mold might, for example, be a hexagon. The mold was filled and raised to a temperature above the softening point of the sleeve and below the softening point of the core, welding the side of each fiber to those in contact with it. If the mold is hexagonal the bundle of conjoined fibers will be hexagonal. The bundle was fixed vertically, its lower face was heated to drawing temperature, somewhat above the softening points of the cores and the sleeves, and drawn. The hexagonal bundle was composed of thousands of optical fibers welded together along generatrices; when drawn the hexagonal shape was retained but the cross section was less than that of the bundle, its dimensions varying by the speed of drawing and the temperature. The drawn optical fibers were cut off at the end to a length substantially equal to the thickness of the prospective optical plate, thus becoming small prismatic disks capable of being placed side by side and angularly interfitted to form a mosaic plate when heated to the softening point of the sleeves of the optical fibers, Moderate centripetal pressure was applied during the formation of the plate from the disks in order to achieve good face to face contract during the welding.

The prior art product and process have been beset with imperfections. For example, the plates were produced with apertures at the interfitting apexes of the angles of the mosaic, being such plates gas untight and unsuitable for electronic purposes where vacuum tightness is necessary and attempts to increase the temperature or the moderate centripetal pressure tended to warp the light-transmitting cores.

It is an object of this invention to make more perfect optical plates by an improved process. The objects of the invention are accomplished generally speaking by applying along the ridges of the angles of the disks an excess of glass which may have a composition the same as or different from the sleeves but which softens at a lower temperature than the cores of the optical fibers and has a lesser index of refraction. It is also an object of the invention to cut down lateral dispersion of light rays from the cores of the optical fibers and this is accomplished by adding a light-absorptive material in the mentioned glass in excess.

The application of the additional low melting glass to the ridges of the disks may be carried out in various ways:

After agglomeration the bundle of optical fibers receives on its ridges a thin accretion of glass of softening point similar to that of the sleeves. After drawing, the drawn bundle has an excess of the more fusible glass on its ridges. Another method is to enamel ridges of the agglomerated bundle with a powder of sleeve glass or of other glass having a similar softening point. The bundle is provided in advance with an excess of lower melting glass along its ridges. Suitable glass particles can be suspended in a vehicle and applied like paint to the ridges. In the mold containing the fibers which are to be agglomerated into the bundle, optical fibers containing an excess of lower-softening glass, or fibers composed solely of lower-softening glass, can be substituted for ridge fibers of normal type. Advantage is also obtained by adding more optical fibers along the ridges.

When the staple fiber optical fibers are assembled and molded according to the prior art the angles at the ridges of the bundles will not usually be perfectly sharp, and as a consequence when the prisms are assembled to make the plate they will touch along their sides but apertures, usually in the shape of triangles of curved side, will exist where the angles of adjoining disks interfit. The small quantity of glass which is added to the ridges by this invention serves to fill in these apertures, providing after welding a final plate in which the parallel cores are held in a continuous matrix of glass, the mosaic pattern being discernible under appropriate illumination and magnification, but having no apertures. If the additions to the ridges have been properly made, the softening point of the sleeves not materially exceeded, the softening temperature of the cores not being trespassed upon, success is assured. In general the temperatures and pressures used are those of the prior art using the same glasses and are between the softening points of the sleeves and cores.

An example of the constitution of useful optical fibers is a core containing 32% $SiO_2$, 64% PbO, and 4% $K_2O$, having an index of refraction of 1.73 and a sleeve of crown glass.

Crown glass has a lower index of refraction and a lower softening point than this core. The softening point of crown glass can be found in works dealing with the subject.

Another example involved a lanthanum glass core and crown glass sleeve, the lanthanum glass having a composition: 14% $SiO_2$, 17% $P_2O_3$, 48.5% BaO, 10.5% $La_2O_3$, and 10% $ThO_2$. Its index of refraction was 1.69.

If the additional glass is also to absorb vagrant rays escaping from the cores, it may, according to the invention, contain a small quantity of a coloring agent, for instance from 0.05% to 0.2% of cobalt oxide according to the present invention.

In considering this invention it should be understood that the formation of optical plates is delicate, especially when the plate is to be large, the sleeves are thin, and the deformation of the cores is to be avoided. The present invention produces mosaic plates of optical fibers free of porosities and with warped and displaced fibers reduced to a minimum. This is achieved at the softening temperature of the sleeve glass under light centripetal pressure.

When the glass powder is to be applied to the ridges in suspension, one may, for example, use a mixture of glass powder of lower softening point in ethyl lactate, wax, terpenic oil, and apply it to each ridge with a brush or a dauber.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views.

FIG. 4 is an enlarged detail, normal to an angular ridge, of a disk according to the invention, showing one method of carrying out the invention;

FIG. 5 is a similar diagrammatic view showing one modification;

FIG. 6 is a third diagrammatic view showing another modification;

FIG. 7 is another diagrammatic view showing a further modification; and

FIG. 8 is a diagrammatic section similar to FIG. 7 illustrating the disk after agglomeration.

Figure 1:
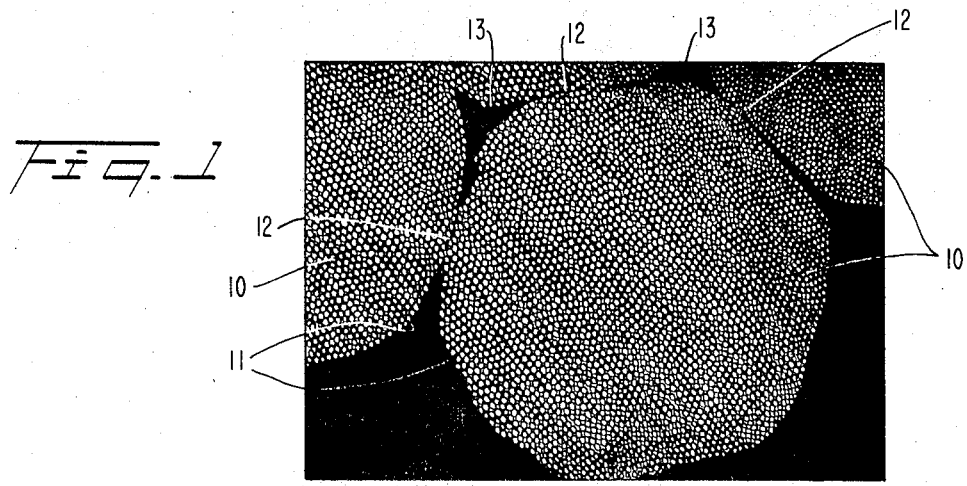
FIG. 1 is a reproduction in plan of a photograph of a prior art mosaic of disks of optical fibers showing the apertures which exist where the ridges interfit.
Figure 2:
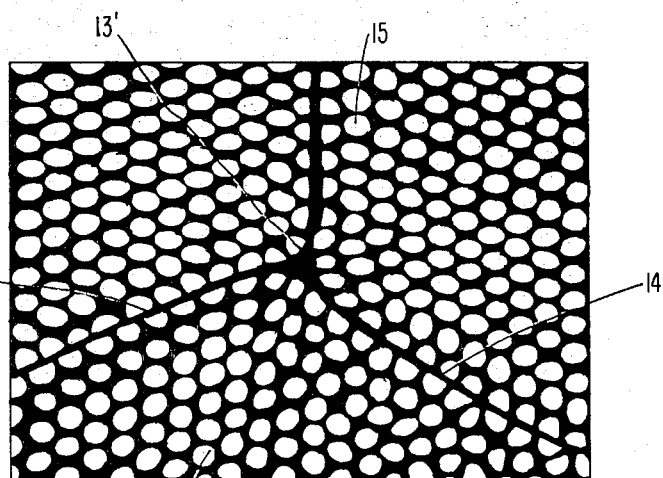
FIG. 2 is a similar view, on enlarged scale, of a mosaic plate made under relatively high pressure in an attempt to close the apertures, the apertures being reduced in size but not eliminated, the pattern of optical fibers in the disks being disarranged, and many optical fibers being distorted in shape.

In FIG. 1 are shown in plan view disks 10 assembled in mosaic as they are prepared according to the prior art. The disks have rounded ridges 11 and make contact along lengths 12 of their sides. Voids 13 occur where the ridges are supposed to interfit and extend from one face to the other as open ended apertures. If the mosaic is subjected to centripetal pressure during agglomeration, by the softening of the sleeve glass, the area of contact will be somewhat increased but the apertures 13 will not be eliminated. As the pressure is increased so as materially to reduce the size of apertures 13 to that shown as 13' in FIG. 2, the liens of contact 14 between contiguous disks of the mosaic become curved and the cores 15 become distorted in shape and warped out of alignment so that some rows are no longer straight.

Figure 3:
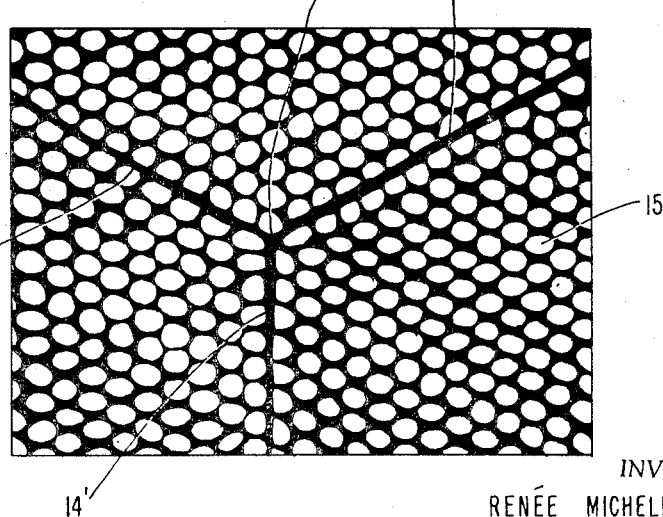
FIG. 3 is a plan of the present product in a view similar to FIG. 2 showing the more equal distribution of the cores, the complete closing of the apertures at the ridges of the interfitting angles, and the retained sphericity of almost all of the cores, departures being few and insignificant and warping of the edges of the disks eliminated.

In FIG. 3 the space at the center 16 of the interfitting ridges is completely filled with glass, the mosaic lines 14' between the disks are straight, the rows of fibers are unwarped and almost no distortion of fiber shape has taken place.

The methods by which this superior product may be manufactured are illustrated diagrammatically in FIGS. 4–8. In FIG. 4, which is a diagram through one angle of a hexagonal prism of a drawn bundle of optical fibers is shown with an excess 21 of glass extending along the ridge formed by the angle. Although this excess softened glass can be applied by machine it can also be applied by hand and it will be assumed for the purpose of this description that these additions are made by hand. The core fibers 20 are set in a vitreous matrix 22 which has been formed during the agglomeration of the bundle.

In FIG. 5 is a bundle in which the cores 20 are still within the sleeves 23 which have been welded to contiguous sleeves but have not yet been melted to form a matrix. The blunt nature of the ridge is indicated and three fibers 24 of glass of composition and softening point and index of refraction similar to that of the sleeves 23 are inserted at the corner to provide the extra low melting glass needed to perfect the plate.

In FIG. 6 a similar result has been accomplished by adding three fibers 20 to the corner these being identical with the other fibers in the disks.

In FIG. 7 three optical fibers 25 are inserted at the corner, these fibers having the same exterior diameter as the fibers 20 but a thicker sleeve of low melting glass and a thinner core of high melting glass.

After agglomeration and the uniting of sleeves 23 in an imperforate matrix 26, and before welding to the contiguous disks has been completed, the ridge of the disk will have, in plan, somewhat the appearance shown in FIG. 8.

The method by which the product of the invention may be manufactured is described subsequently:

The fibers 20 embody a core and a cladding of following compositions glasses:

CORE $SiO_2$—14%
$B_2O_3$—17%
BaO—48.5%
$La_2O_3$—10.5%
$ThO_2$—10%
Index of refraction—1.69
Softening point—645° C.

CLADDING $SiO_2$—52.8%
$B_2O_3$—15.2%
$Al_2O_3$—16.8%
$K_2O$—4.2%
$Li_2O$—1.6%
F—10.2%
Index of refraction—1.48
Softening point—480° C.

These optical fibers have a diameter which may be of several hundreds microns for example of 400 microns and a length of 10 centimeters. A plurality of these parallel fibers are placed in a hexagonal mold of generally several tens of millimeters, for example 32 millimeters per side and 10 centimeters of length.

After vibrating during 5 minutes to assume the best compacity, the mold is placed into an electrically heated furnace where the temperature is carefully controlled. The time-temperature cycle normally used is as follows:

Temperature is raised in 2 hours to 580° C.
Temperature is maintained for 1 hour at approximately 580° C. to 600° C.
Temperature is lowered in 8 hours to ambient temperature A bundle is obtained during this heating process that fuses lightly the fibers together.

After cooling the bundle that has a hexagonal cross-sectional shape, its ridges are covered with a mixture of glass powder of the above-mentioned cladding glass in ethyllactate; this application is handily made with a brush to obtain a coat of 0.1 millimeter thickness. Although this excess of glass is applied by hand, it can also be applied by machine.

The bundle is suspended vertically and its lower part is heated to about 850° C. Then the bundle is drawn to a multifiber optical structure. This multifiber structure has a hexagonal cross sectional shape but with an excess of glass on its ridges. Its cross-sectional size is approximately 5–10 microns.

These multifiber structures are cut into disks whose length is the thickness of the desired cathode plate, approximately 6 millimeters, and loaded in a mold to form a mosaic as shown on FIG. 1. This mosaic is placed in a furnace where temperature is controlled according to the following cycle:

Temperature is raised in 4 hours to 600° C.
Temperature is miantained for 12 hours at 600° C.–640° C.
Temperature is lowered in 8 hours to ambient temperature During this final heating process a relatively low centripetal compressing force is applied to the mosaic. Satisfactory results are obtained when using a pressure of 10–20 kg./cm.$^2$.

The application of the additional glass, carried out in this example after forming the bundle of optical fibers, can be made also on the bundle while forming the same or on the fiber obtained after drawing or even on the disks before assemblying the mosaic.

Although the specification hereinabove has treated of the application of excess glass as to the ridges of the prism before assembly in the mosaic, a similar effect can be achieved by stuffing the apertures 13 with additional fibers after the mosaic has been assembled and before it has been pressed and agglomerated.

Among the advantages of the invention are an improved mosaic plate composed of optical fiber cores set in a matrix of sleeve glass, free of apertures, with substantial straight lines between the disks of the mosaic, with the rows of fibers substantially undisturbed in their alignment, and the fibers themselves substantially undistorted throughout the body of the plate and with only trivial distortion at the mosaic lines.

Other advantages include a reduction in the random diffusion of light by reducing the distortion of the cores and consequent refraction through the walls, and by absorbing such rays as do escape in darkened glass at the interfitting ridges of the disks. Another advantage is in the reduction of pressure which is required to obtain perfection in joining the disks together.

The machinery which has been used heretofore for the manufacture of such plates, disks, drawn bundles, and optical fibers can be employed to carry out this process.

As many apparently widely different embodiments of the present invention may be made without departing from the spirit and scope thereof, it is to be understood that the invention is not limited to the specific embodiments.

What is claimed is:

1. A method of making an optical image transfer plate from cladded glass, fibers, which comprises, uniting a multiplicity of cladded glass fibers in coextensive side-by-side relation to form an elongated bundle polygonal in transverse section and thus defining circumferentially-spaced, longitudinally-extending ridges, applying to and along said ridges only of the bundle an excess of cladding glass having a softening temperature below the softening temperature of the core glass of the fibers, severing the bundle transversely into sections of length equal to the desired thickness of the plate to be formed, assembling a multiplicity of said sections in interfitting, contiguous, coextensive relation, heating the assembly with centripetal compression to a temperature at least equal to the softening temperature of the cladding glass of the fibers and of said excess of cladding glass, but below the softening temperature of the core glass of the fibers, until the softened cladding glass forms a continuous matrix about the fiber cores and unites the sections into an imperforate image transfer plate, and cooling the plate.

2. The method of claim 1, said excess of cladding glass being applied by suspending glass powder in a vehicle and applying the suspension to the ridges of the bundle, heating the bundle to drawing temperature, drawing the heated bundle, and severing the drawn bundle into sections, as aforesaid.

3. The method of claim 1, said excess of cladding glass being applied in softened state to and along the ridges of the bundle, heating the bundle to drawing temperature, drawing the heated bundle, and severing the drawn bundle into sections, as aforesaid.

4. The method of claim 1, said excess of cladding glass being applied by substituting for the fibers at and along the ridges of the bundle, fibers having a greater proportion of cladding glass than the remaining fibers constituting the bundle.

5. The method of claim 1, said excess of cladding glass being applied by substituting for cladded fibers at and along said ridges of the bundle, fibers of essentially solid glass having a composition and softening temperature like that of the cladding of the remaining fibers of the bundle.

6. The method of making an optical image transfer plate, comprising, forming from cladded glass fibers cohered together in coextensive side-by-side relation, a bundle of polygonal cross section having longitudinally-extending ridges, severing the bundle transversely into sections of length equal to the predetermined thickness of the plate to be formed, applying excess cladding glass to and along the ridges only of the severed sections, assembling the sections in coextensive interfitting mating relation to form an incipient plate, and heating the sections so assembled, to fuse the cladding glass only and thereby form a unitary imperforate plate.

7. The method of claim 6, the fibers forming said bundle being cohered by raising the temperature thereof to about 580° C. in 2 hours, maintaining the temperature thereof at about 580° C. to 600° C. for 1 hour, and lowering the temperature to ambient in about 8 hours.

8. The method of claim 7, and after the bundle is at ambient temperature and excess glass has been applied thereto as aforesaid, drawing the bundle at about 850° C. to reduce the cross sectional area thereof without alternation of polygonal cross-sectional form, and with excess glass remaining on and along the ridges of the drawn bundle.

9. The method of claim 8, and after the sections into which the drawn bundle has been severed, have been assembled into an incipient plate, raising the temperature of the assembly to about 600° C., in 4 hours, maintaining the temperature at 600° to 640° C. for 12 hours, and lowering the temperature to ambient in 8 hours.

10. The method of claim 6, said bundle being hexagonal in cross section.

References Cited

UNITED STATES PATENTS

| | | | |
|---|---|---|---|
| 3,216,807 | 11/1965 | Woodcock | 65—LRDigUX |
| 3,241,934 | 3/1966 | Granitsas et al. | 65—31X |
| 3,253,896 | 5/1966 | Woodcock et al. | 65—4X |
| 3,278,283 | 10/1966 | Bazinet, Jr. | 65—4 |
| 3,279,903 | 10/1966 | Siegmund | 65—4 |
| 3,323,886 | 6/1967 | Hays | 65—4 |
| 3,379,558 | 4/1968 | Upton | 65—4X |
| 3,387,959 | 6/1968 | Cole | 65—4 |
| 3,445,273 | 5/1969 | Gallagher | 65—LRDigUX |

FRANK W. MIGA, Primary Examiner

U.S. Cl. X.R.

65—38, 43, 108